(12) United States Patent
Bijaoui

(10) Patent No.: US 9,358,840 B2
(45) Date of Patent: Jun. 7, 2016

(54) TIRE FOR A VEHICLE CARRYING HEAVY LOADS

(75) Inventor: Denis Bijaoui, Bangkok (TH)

(73) Assignees: COMPAGNIE GENERAL DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 972 days.

(21) Appl. No.: 13/509,519

(22) PCT Filed: Oct. 26, 2010

(86) PCT No.: PCT/EP2010/066115
§ 371 (c)(1),
(2), (4) Date: Aug. 2, 2012

(87) PCT Pub. No.: WO2011/064056
PCT Pub. Date: Jun. 3, 2011

(65) Prior Publication Data
US 2012/0298271 A1    Nov. 29, 2012

(30) Foreign Application Priority Data
Nov. 26, 2009  (FR) ..................... 09 58406

(51) Int. Cl.
*B60C 11/03* (2006.01)
*B60C 1/00* (2006.01)
(Continued)

(52) U.S. Cl.
CPC ........... *B60C 11/0309* (2013.04); *B60C 11/005* (2013.01); *B60C 11/0058* (2013.04);
(Continued)

(58) Field of Classification Search
CPC .. B60C 1/0016; B60C 11/00; B60C 11/0041; B60C 11/005; B60C 11/0058; B60C 11/0075
See application file for complete search history.

(56) References Cited

U.S. PATENT DOCUMENTS 5,937,926 A  * 8/1999 Powell ................. B60C 1/0016
                                                      152/152.1
2010/0230020 A1  9/2010 Yoshinaka et al.

FOREIGN PATENT DOCUMENTS

DE   102007022147   * 11/2008
EP       662396    *  7/1995
(Continued)

OTHER PUBLICATIONS

International Search Report (PCT/ISA/210) issued on Dec. 28, 2010, by the French Patent Office as the International Searching Authority for International Application No. PCT/EP2010/066115.

*Primary Examiner* — Justin Fischer
(74) *Attorney, Agent, or Firm* — Dickinson Wright PLLC

(57) ABSTRACT

Tire carrying heavy loads comprising a tread band having a plurality of grooves of transverse overall orientation, formed of at least three rubber materials: —a first material M1, in the median part of the tread band, having a secant modulus at 10% elongation measured at a temperature of 23° C. at least equal to 4.0 MPa and hysteresis losses $\tan(\delta)_{max}$ greater than 0.19, —a second material M2, on the edge parts, having a secant modulus at 10% elongation, at 23° C., lower than the first material, and a hysteresis losses value $\tan(\delta)_{max}$ lower than the first material and at least 0.15, —a third material M3, radially below the materials M1 and M2, having a hysteresis losses value $\tan(\delta)_{max}$ lower than 0.12, —wherein first material M1 has a resistance to wear at least 15% better than the second and third materials, which have substantially the same resistance to wear.

7 Claims, 3 Drawing Sheets

(51) Int. Cl.
*B60C 11/117* (2006.01)
*B60C 11/00* (2006.01)

(52) U.S. Cl.
CPC ..... *B60C11/0311* (2013.04); *B60C 2011/0025* (2013.04); *B60C 2011/0033* (2013.04); *B60C 2200/06* (2013.04)

(56) References Cited

FOREIGN PATENT DOCUMENTS

| | | | |
|---|---|---|---|
| EP | 839675 | * | 5/1998 |
| EP | 2 067 637 A1 | | 6/2009 |
| EP | 2 116 396 A1 | | 11/2009 |
| FR | 1 445 678 A | | 10/1966 |
| JP | 57-144109 | * | 9/1982 |
| JP | 2-53605 | * | 2/1990 |
| JP | 6087302 | | 7/1992 |
| JP | 11-208216 A | | 8/1999 |
| JP | 2001-47815 | * | 2/2001 |
| JP | 3202794 | * | 8/2001 |
| JP | 3418131 | * | 6/2003 |
| JP | 2004-306769 A | | 11/2004 |
| JP | 2004-345432 | * | 12/2004 |
| JP | 2005-263127 | * | 9/2005 |
| JP | 2006-327256 | * | 12/2006 |
| JP | 2009040179 | | 2/2009 |
| KR | 754862 | * | 9/2007 |
| WO | 2006134776 | | 12/2006 |
| WO | WO 2009/020066 A1 | | 2/2009 |
| WO | WO 2009/124816 | * | 10/2009 |

* cited by examiner

TIRE FOR A VEHICLE CARRYING HEAVY LOADS

The invention relates to the tread bands of tyres for machinery carrying heavy loads, such as construction machinery, and relates more specifically to the materials of which these tread bands are made.

A tyre for construction machinery generally comprises a carcass reinforcement anchored in beads, this reinforcement, made up of at least one ply of reinforcing elements, being capped radially on the outside by a crown reinforcement. This crown reinforcement is made up of a plurality of plies of reinforcing elements which are crossed from one ply to the next and is capped radially on the outside by a tread band the purpose of which is to provide contact between the tyre and the surface over which the tyre runs and to transfer load between the said tyre and the said surface.

In use, it is found that there are at least two desired performance aspects, namely good resistance of the tread band to wear and good endurance in the face of attack from foreign bodies present on the surface on which the tyre runs. Specifically, it is desirable that, when running over surfaces substantially free of any foreign bodies, the wear of the tread band, that is to say the amount of material that is worn away and removed by friction, is as small as possible for a given distance covered.

On the other hand, use on terrain on which there are numerous stones and other bodies is aggressive toward the tread band. For machinery carrying heavy loads such as the construction machinery used in mines, it is a known fact that the tread bands of the tyres fitted to these vehicles are subjected to repetitive shocks which may, in addition to tearing out material from the tread band, lead to failures through delamination between the various materials in the crown of the tyre, notably between the tread band and the crown reinforcement.

It was known, notably from patent document FR1445678, that the performance and features of the materials that make up the said tread band can be adapted to suit the region in the tread band. That document indicates that the central part of a tread band can be made of a material that has a resistance to wear that is better than that of the material used to form the lateral parts and this same material that forms the central region has lower grip than the material used in the lateral parts.

The subject of the invention is a tread band for construction machinery which makes it possible both to even out performance in terms of wear and impact resistance of the tread band while at the same time improving the endurance performance of the edge parts of the said tread band.

The tyre according to the invention is intended to be fitted to a vehicle carrying heavy loads and running over very uneven terrain; this tyre comprises a carcass reinforcement anchored in beads, these beads being intended to come into contact with a mounting rim. This carcass reinforcement is, radially on the outside, capped by a crown structure comprising a crown reinforcement itself capped radially on the outside by a tread band intended to provide rolling contact with the ground.

This tread band is provided, on each side of a median plane, with grooves of mean depth P and of transverse overall orientation comprising two ends, a first end opening toward the outside of the tread band and a second end, known as the inner end, which does not open out. The inner end of each transverse groove is situated a non-zero distance away from the median plane of the tread band.

A median part comprised axially between the inner ends of the transverse grooves is defined on this tread band. This median part has a width Lc at least equal to 20% of the total width W of the tread band and at most equal to 80% of this width. Axially on each side of this median part are edge parts.

This tread band is formed of three rubber materials with different specific properties:
- a first material is situated over a width at least equal to 80% of the width Lc of the median part and at most equal to 80% of the total width W of the tread band, and over a thickness P1 equal to at least 20% and at most 80% of the mean depth P of the transverse grooves,
- a second material situated axially on the outside of the median part over a depth P2 equal or substantially equal to the depth P1,
- a third material situated radially on the inside of the combination of the median part and of the edge parts, this third material extending over a depth at least equal to the difference between the mean depth P of the transverse grooves and the thickness P1 of the first material.

These three tread band materials are chosen so that they have the following properties:
- the first material has a secant modulus at 10% elongation measured at a temperature of 23° C. at least equal to 4.0 MPa and hysteresis losses $\tan(\delta)_{max}$ (losses measured at 60° C. on a Metravib V A4000 viscoelastometer in accordance with standard ASTM D 5992-96) greater than 0.19;
- the second material has a secant modulus at 10% elongation, measured at 23° C., lower than that of the first material, and a hysteresis losses value $\tan(\delta)_{max}$ lower than that of the first material and at least equal to 0.15;
- the third material has very low hysteresis, that is to say has a hysteresis losses value $\tan(\delta)_{max}$ lower than 0.12.

Furthermore, the first material has a resistance to wear which is at least 15% better than that of the second and third materials, the latter two materials having substantially the same resistance to wear.

The wear performance of a material is evaluated on the basis of the ratio (expressed as a percent (%)) between the loss of weight of the reference material and the loss of weight of the material that is to be tested. This measurement is performed on an erosion machine. A test specimen "skid" slides along a circular track provided with a coating of the actual ground covering type corresponding to the use of the tyre carrying heavy loads. The imposed parameters are the force of contact perpendicular to the surface of contact between the skid and the track, the rate of slip of the skid, the length slid, and the temperature of the space in which the measurements are taken.

Furthermore, the first material is highly cohesive, that is to say that the stresses at break (expressed in MPa) and the elongations at break (expressed in %) measured at 60° C. are substantially higher, by at least 20%, than the stresses at break and the elongations at break of the other materials.

Thanks to this special arrangement of materials in the tread band it is possible to obtain a significant improvement in performance in terms of resistance to wear, resistance to attack and endurance by comparison with the tyre of the prior art, and notably by comparison with the tyre described in patent document FR1445678.

For preference, the first material has a trapezoidal shape in meridian cross section so that its width for contact with the ground increases progressively with wear.

According to an advantageous alternative, the third material comprises, on each side of the median plane of the tread band, an additional thickness representing approximately 20% of its mean thickness. This additional thickness has a width equal to at least 5% of the total width W of the tread band and lies a distance that exceeds 10% of the total width W away from the median plane. Thanks to this addition of material, the hysteresis of which is very low by comparison with the first material in the central part, it is possible to reduce the operating temperature of the tyre in the regions in which these additional thicknesses are present, thus improving its endurance.

In another alternative form of tyre according to the invention, the tread band comprises a fourth material positioned between the crown reinforcement and the third material over the entire width of this third material. This fourth material is chosen to have the following properties:
  a secant extension modulus at 10% elongation and at a temperature of 23° C. of 4.0 MPa,
  a hysteresis losses value $\tan(\delta)_{max}$ lower than 0.11.

This fourth material has a thickness of more than 15% of the thickness of the first material.

Other features and advantages of the invention will become apparent from the description given hereinafter with reference to the attached drawings which, by way of nonlimiting examples, disclose some embodiments of the subject matter of the invention.

FIG. 1 shows the rolling surface 10 of a tread band 1 of a tyre according to the invention. This tread band has a total width W and has a median plane (of which the intersection with the plane of FIG. 1 is identified by the line XX') that splits the tread band substantially into two halves of equal axial widths.

Figure 1:
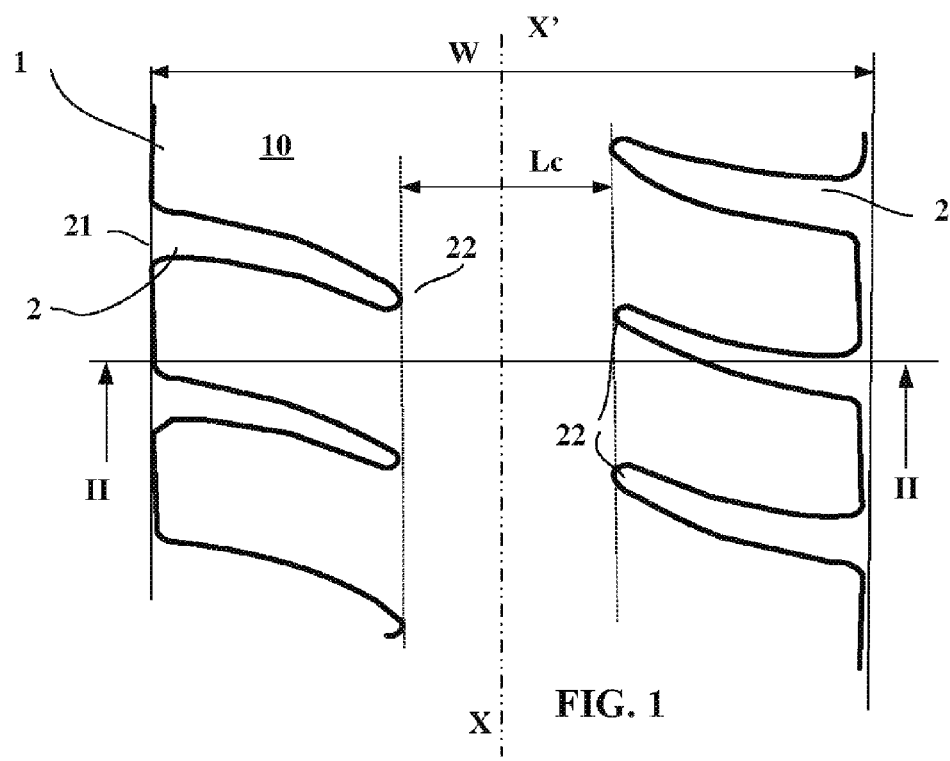
FIG. 1 shows a plan view of a tread pattern of a tread band according to the invention.

This tread band 1 comprises, on each side of the median plane XX', a plurality of transverse grooves 2 oriented substantially in the transverse direction, that is to say at an angle smaller than 45° to the axis of rotation (axis the direction of which is perpendicular to the direction XX'). Each transverse groove 2 has a mean depth and has two ends 21, 22 of which one, the outer end 21, which is axially on the outside, opens onto an edge of the tread band and of which the other, the inner end 22, axially on the inside, does not open out laterally. This inner end 22 is situated a non-zero distance away from the median plane. A median part of width Lc extending axially between the inner ends 22 of the transverse grooves 2 situated on each side of the median plane XX' is defined. This width Lc here is substantially equal to ⅓ of the total width W of the tread band.

Figure 2:
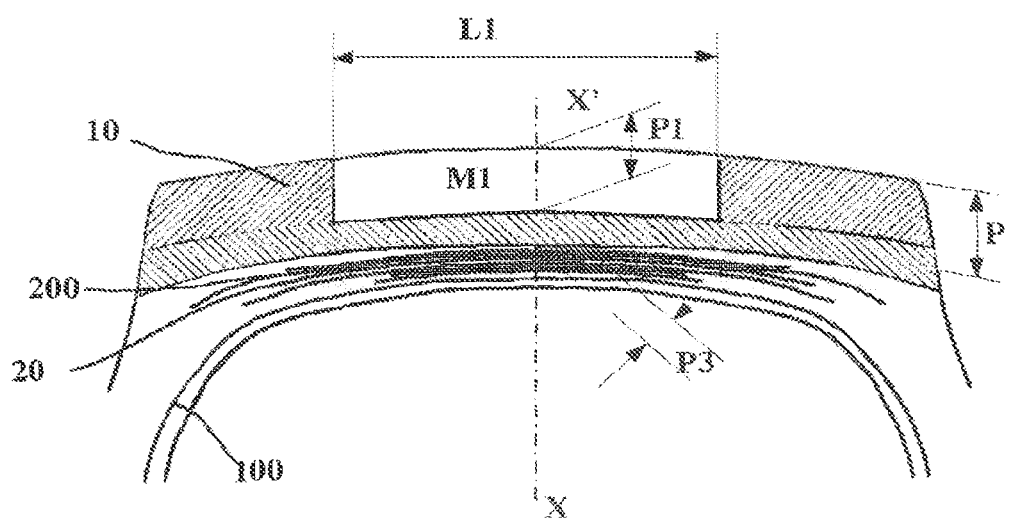
FIG. 2 shows a partial section on II-II of the tyre shown in FIG. 1.

FIG. 2 shows a view in section on a radial plane (that is to say a plane containing the axis of rotation) of which the intersection with the plane of FIG. 1 corresponds to the line II-II shown in FIG. 1. It can be seen that the tyre comprises a carcass reinforcement 100 capped radially on the outside by a crown structure 200 comprising, on the one hand, a crown reinforcement 20 formed of a plurality of reinforcing plies and, on the other hand, capping this crown reinforcement 20 radially on the outside, a tread band 10, the latter being formed of three rubber-based materials.

Over a width L1 greater than the width Lc of the median part, there can be seen a first material M1 which is situated on each side of the median plane XX'; this width L1 is equal to approximately 60% of the total width W of the tread band. This first material M1 extends over a mean thickness P1 equal to 70% of the mean depth P of the transverse grooves, this mean thickness P1 being measured on the median plane. This first material M1 has a secant modulus at 10% elongation measured at a temperature of 23° C. of at least 4.0 MPa and hysteresis losses $\tan(\delta)_{max}$ higher than 0.19.

A second material M2 is situated axially on the outside on each side of the median part over a thickness P2 equal to the thickness P1. This second material has a secant modulus at 10% elongation, measured at 23° C., lower than that of the first material and a hysteresis losses value $\tan(\delta)_{max}$ lower than that of the first material and at least equal to 0.15.

A third material M3 is situated radially on the inside of the combination of the median part and of the edge parts and extends over a thickness P3 greater than the difference between the mean depth P of the transverse grooves and the thickness of material P1 in the central region. This third material has a hysteresis losses value $\tan(\delta)_{max}$ of less than 0.12.

Further, the first material M1 has a resistance to wear which is at least 15% better than that of the second and third materials, these two latter materials having substantially equal resistances to wear. In this document, the wear performance of a material is evaluated in terms of the ratio (expressed as a percentage—%) between the loss of weight of the reference material and the loss of weight of the material that is to be tested. This measurement is taken using a so-called erosion machine. A test specimen in the form of a "skid" slides along a circular track provided with a coating of the actual ground covering type corresponding to the use of the tyre. The imposed loading parameters are the force of contact perpendicular to the surface for contact between the skid and the track, the speed at which the skid is slid, the length slid and the temperature of the space in which the measurement is taken. The thicknesses remaining after wear are measured.

Thanks to this arrangement of three materials, it is possible to obtain both a significant improvement in the performance of the tread band in relation to wear and in terms of attack resulting from the shock of running over the obstacles encountered on the ground, and in terms of overall endurance.

The presence of the third material across the entire width of the tread band and radially under the first and second materials of which the said tread band is made makes it possible to reduce the operating temperature of the tyre. In the median part, the risks of separation between the tread band and the crown reinforcement are thus avoided while the presence of this third material radially under the edge parts improves the resistance to delamination at the axial ends of the crown reinforcement.

Figure 3:
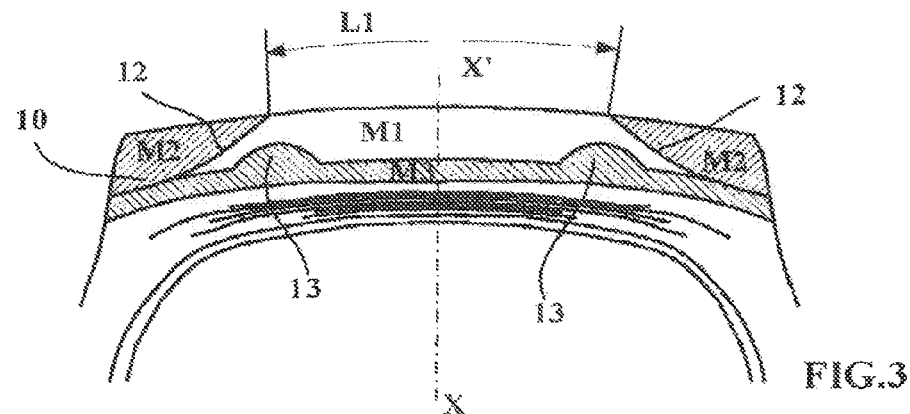
FIG. 3 shows another alternative form of tyre according to the invention, showing a specific profile of the third material.

FIG. 3 shows, in section on a plane containing the axis of rotation, an alternative form of embodiment of a tyre comprising a tread band according to the invention formed of three materials M1, M2, M3 as was described with the previous example. In this alternative form, the surfaces 12 at the junctions between the first and second materials have, when viewed in the plane of section containing the axis of rotation, plots which are inclined with respect to the radial direction (parallel to the direction of the axis XX'), the radially innermost point (i.e. the point closest to the axis of rotation of the tyre) of the first material on these plots lying axially on the outside of the radially outermost point of the first material. Thus, the first material M1 has a trapezoidal shape in cross section in a radial plane of section (plane containing the axis of rotation) so that its width for contact with the ground increases progressively as the tread band wears down, starting from the value L1 when the tread band is new (i.e. before it has been run at all).

Furthermore, this alternative form combines this arrangement with the presence of additional thicknesses 13 of a third material M3 partially replacing the first material M1. These two additional thicknesses 13 are lens shaped and have respectively a width representing 10% of the total width W of the tread band and a maximum height of 25% of the thickness of the first material M1.

Figure 4:
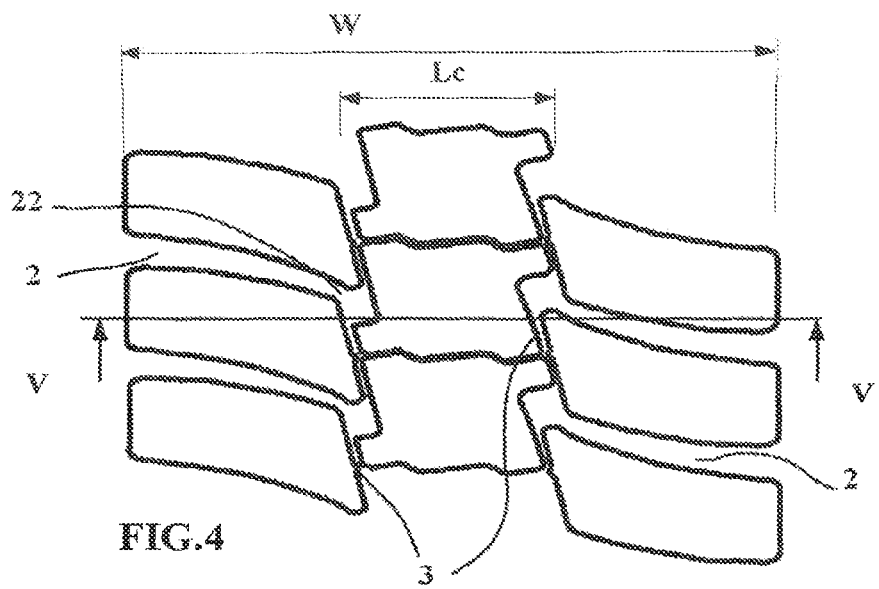
FIG. 4 shows a plan view of the rolling surface of an alternative form of tread band according to the invention.
Figure 5:
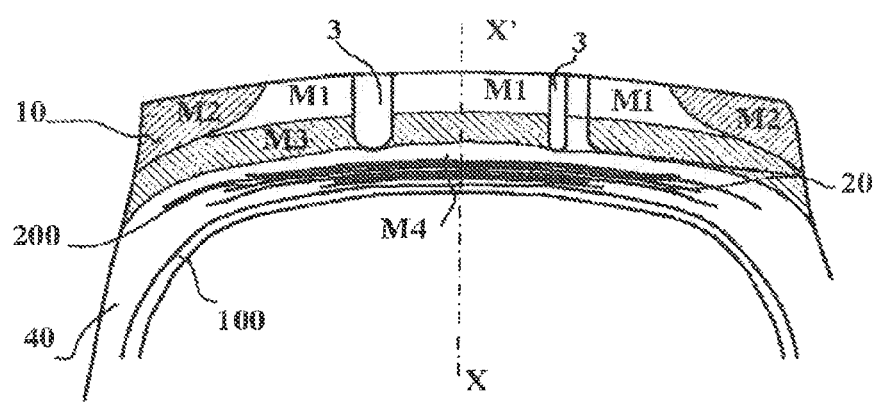
FIG. 5 shows, in section on V-V of the tyre shown in FIG. 4, an alternative form of tyre according to the invention comprising a fourth material radially on the inside of the third material of the tread band.

FIG. 4 and FIG. 5 show one and the same other alternative form of tread band according to the invention, this one comprising, in addition to the three materials described, a fourth material radially on the inside. The tyre in question is a tyre of the size 37.00 R 57 intended to be fitted to a construction vehicle driving notably over ground that may be aggressive toward the materials of the tread band.

In this alternative form, the design of the tread pattern when viewed in plan as shown in FIG. 4 comprises, in addition to the transverse grooves 2 as described for the previous examples, two grooves 3 of circumferential overall orientation. Each of the transverse grooves 2 opens at its inner end 22 into a circumferential groove 3.

FIG. 5 shows a partial view in section comprising sidewalls 40 connected to a crown part 200. This tyre comprises a carcass reinforcement 100 capped radially on the outside by a crown reinforcement 20 itself capped by a tread band 10 one surface of which is intended to be in contact with the ground during running.

The tread band 10 extends over a total width W equal to 895 mm. This tread band is provided with two circumferential grooves 3 extending mainly in the circumferential direction and with a plurality of transverse grooves opening into the circumferential grooves. The tread band has a total thickness of 98 mm.

The transverse grooves have the same mean width of 12 mm and a mean depth P of 75 mm (this mean depth is measured substantially mid-way between the inner and outer ends of these a central part of the tread band. These circumferential grooves have a mean width less than that of the transverse grooves and a depth substantially equal to the mean depth P.

The crown reinforcement of this tyre comprises a stack of several plies, two of them, known as the hooping plies, being reinforced with reinforcing elements that make a small angle with respect to the circumferential direction (small here means less than 10 degrees). These hooping plies occupy a total width at least equal to the minimum distance separating the circumferential grooves. Radially on the outside of these hooping plies there are working plies and protective plies.

The tread band of the tyre shown in FIG. 4 is formed of four separate materials.

A first material M1 is situated axially throughout the central part of the tread band over a thickness P1 equal to 70 mm, namely, in this instance, 76.5% of the depth of the grooves here equal to 98 mm. The central part extends symmetrically on each side of the equatorial plane and over a total width of 580 mm, namely about 65% of the total width W of the tread band which here is equal to 895 mm.

A second material M2 is situated on the edge regions over a thickness P2 equal to 65 mm, namely 66% of the depth P of the grooves. In this particular instance, the surfaces for contact between the second material M2 and the first material M1 are positioned axially on the outside of the circumferential grooves 3.

A third material M3 is positioned radially on the inside of the combination of the central region and of the edge regions, and extends over a thickness at least equal to the difference between the depth P of the grooves and the thickness of material P1 in the central region. In this particular instance, the thickness of this third material varies across the width of the tread band and ranges between 17 mm (in the central region) and 32 mm (in the edge regions).

A fourth material M4 is situated radially on the inside of the third material M3 over the entire width W of the tread band, that is to say under the central part and the edge parts. The thickness of this fourth material varies across the width of the tread band and does so symmetrically with respect to the median plane; this thickness ranges between 19 mm and 27 mm.

These four materials of which the tread band is made are also chosen to have the following properties:

the first material M1 has a hysteresis loss $\tan(\delta)_{max}$ equal to 0.19 and a secant elastic modulus at 10% elongation and 23° C. of 4.3 MPa;

the second material M2 has a hysteresis loss $\tan(\delta)_{max}$ equal to 0.16 and a secant elastic modulus at 10% elongation and 23° C. of 3.7 MPa.

the third material M3 has a hysteresis loss $\tan(\delta)_{max}$ equal to 0.11.

the fourth material M4 has a hysteresis loss $\tan(\delta)_{max}$ equal to 0.07 and a secant elastic modulus at 10% elongation and 23° C. equal to 4.0 MPa.

Further, the first material M1 has a resistance to wear which is 20% better than those of the second and third materials, remembering that the resistance to wear of a rubbery material is determined using a test performed on an erosion machine using test specimens that are subjected to imposed conditions of pressure, rate of slip and length slid at the temperature of the space. The reduction in height of the test specimen per unit length slid and the total loss of mass are measured.

This structure makes it possible to obtain improved protection of the central part of the tread band against attack under running conditions.

In a preferred embodiment that corresponds to the alternative form shown, the width of the first material that forms the tread band is at least equal to the width of the largest of the hooping plies.

The invention is not restricted to the examples described and depicted and various modifications can be made thereto without departing from its scope.

The invention claimed is:

1. A tire adapted to be fitted to a vehicle carrying heavy loads, comprising
    a carcass reinforcement anchored in beads, wherein the carcass reinforcement is, radially on the outside, capped by a crown structure comprising a crown reinforcement, which is itself capped radially on the outside by a tread band adapted to provide rolling contact with the ground, wherein
    the tread band is provided, on each side of a median plane XX' that divides the band into two halves of substantially the same width, a plurality of grooves of transverse overall orientation, wherein
    the transverse grooves have two ends, an outer first end opening to the outside of the tread band and an inner second end situated on the inside of the tread band, wherein the inner second end is situated a non-zero distance away from the median plane, wherein the transverse grooves having a mean depth P, wherein the tread band is split axially into a middle part extending axially between the inner second ends of the transverse grooves on each side of the median plane and edge parts axially on the outside of the middle part, the middle part having a width Lc at least equal to 20% of a total width W of the tread band and at most equal to 80% of this width W, wherein the tread band is formed of at least three rubber materials having different specific properties:
- a first material M1, situated on each side of the median plane and having a total width at least equal to 80% of the width Lc of the middle part and at most equal to 80% of the total width W of the tread band, and having a mean depth P1 equal to at least 20% and at most 80% of the mean depth P of the transverse grooves, wherein the mean depth P1 is measured on the median plane,
- a second material M2 situated axially on the outside on each side of the middle part having a depth P2 equal or substantially equal to the depth P1,
- a third material M3 situated radially on the inside of the combination of the middle part and of the edge parts, having a depth at least equal to the difference between the mean depth P of the transverse grooves and the thickness P1 of the first material, these three tread band materials having the following properties:
   the first material M1 has a secant modulus at 10% elongation measured at a temperature of 23° C. at least equal to 4.0 MPa and hysteresis losses $\tan(\delta)_{max}$ greater than 0.19,
   the second material M2 has a secant modulus at 10% elongation, measured at 23° C., lower than that of the first material, and a hysteresis losses value $\tan(\delta)_{max}$ lower than that of the first material and at least equal to 0.15,
   the third material M3 has a hysteresis losses value $\tan(\delta)_{max}$ lower than 0.12, and wherein
   the first material M1 has a resistance to wear which is at least 15% better than that of the second and third materials, the latter two materials having substantially the same resistance to wear.

2. The tire according to claim 1 wherein the first and second materials are joined at junctions having surfaces, and wherein the surfaces at the junctions between the first and second materials have, when viewed in a plane of section containing the axis of rotation, plots which are inclined with respect to the radial direction, the radially innermost point of the first material on these plots lying axially on the outside of the radially outermost point of the first material.

3. The tire according to claim 1 wherein the tread band further comprises
a fourth material M4 situated radially on the inside of the third material, this fourth material M4 having the following features:
   a secant extension modulus at 10% elongation and at a temperature of 23° C. of 4.0 MPa,
   a hysteresis losses value $\tan(\delta)_{max}$ lower than 0.11.

4. The tire according to claim 3 wherein the third material M3 comprises an additional thickness representing approximately 20% of its mean thickness, this additional thickness having a width of at least 5% of a total width W of the tread band and lying a distance away from the median plane that exceeds 10% of the total width W of the tread band.

5. The tire according to claim 3 wherein the tread pattern on the tread band is further provided with two grooves of circumferential overall orientation which are situated axially at extremes of a central part of the tread band such that the transverse grooves open into these circumferential grooves, a width L1 over which the first material M1 extends being at least equal to the width Lc of the middle part, wherein the first and second materials having mutual-contact surfaces positioned axially on the outside in relation to the circumferential grooves.

6. The tire according to claim 1 wherein the third material M3 comprises an additional thickness representing approximately 20% of its mean thickness, this additional thickness having a width of at least 5% of a total width W of the tread band and lying a distance away from the median plane that exceeds 10% of the total width W of the tread band.

7. The tire according to claim 1 wherein the tread pattern on the tread band is further provided with two grooves of circumferential overall orientation which are situated axially at extremes of a central part of the tread band such that the transverse grooves open into these circumferential grooves, a width L1 over which the first material M1 extends being at least equal to the width Lc of the middle part, wherein the first and second materials having mutual-contact surfaces positioned axially on the outside in relation to the circumferential grooves.

* * * * *